United States Patent
Simcina et al.

(10) Patent No.: US 9,782,695 B2
(45) Date of Patent: Oct. 10, 2017

(54) DE-AERATION DEVICE FOR A HYDRAULICALLY ACTUATED VARIABLE VALVE ACTUATION SYSTEM

(71) Applicant: Schaeffler Technologies GmbH & Co. KG, Herzogenaurach (DE)

(72) Inventors: Todd Simcina, Huntington Woods, MI (US); John Stallmann, Washington, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 394 days.

(21) Appl. No.: 14/571,872

(22) Filed: Dec. 16, 2014

(65) Prior Publication Data

US 2015/0224423 A1    Aug. 13, 2015

Related U.S. Application Data

(60) Provisional application No. 61/938,519, filed on Feb. 11, 2014.

(51) Int. Cl.
    *B01D 19/00* (2006.01)
    *F15B 21/04* (2006.01)

(52) U.S. Cl.
    CPC ..... *B01D 19/0042* (2013.01); *B01D 19/0057* (2013.01); *F15B 21/044* (2013.01)

(58) Field of Classification Search
    CPC .................. B01D 19/0057; B01D 19/00; B01D 19/0042; B01D 19/0052; F15B 12/044
    USPC ............. 95/241, 260, 261; 96/155, 204, 216
    See application file for complete search history.

(56) References Cited

U.S. PATENT DOCUMENTS 9,212,672 B2 * 12/2015 Larson ............... B01D 19/0036
2002/0007736 A1  1/2002 Hearn et al.

FOREIGN PATENT DOCUMENTS

GB          763004        12/1956

* cited by examiner

*Primary Examiner* — Robert A Hopkins
(74) *Attorney, Agent, or Firm* — Volpe and Koenig, P.C.

(57) ABSTRACT

A hydraulic fluid de-aeration device for a hydraulically actuated variable valve actuation system is provided. The device includes a de-aeration bridge having a first end and a second end. The device includes a conical de-aeration chamber having an outer wall and a generally vertical center axis. The second end of the de-aeration bridge is offset from the center axis of the de-aeration chamber such that hydraulic fluid flowing from the de-aeration bridge is directed towards the outer wall of the de-aeration chamber. The device includes a cover with a vent hole for air that is expelled from the hydraulic fluid. A passage connected to the de-aeration chamber supplies the hydraulic fluid to a hydraulic fluid gallery of the variable valve actuation system.

20 Claims, 7 Drawing Sheets

DE-AERATION DEVICE FOR A HYDRAULICALLY ACTUATED VARIABLE VALVE ACTUATION SYSTEM

INCORPORATION BY REFERENCE

The following documents are incorporated herein by reference as if fully set forth: U.S. Provisional Patent Application No. 61/938,519, filed Feb. 11, 2014.

FIELD OF INVENTION

This invention is generally related to a de-aeration device and more particularly related to a de-aeration device for hydraulic fluid used in a hydraulically actuated variable valve actuation system.

BACKGROUND

De-aeration devices are designed to remove air content from a fluid to improve the functioning characteristics of the fluid in a system. De-aeration devices for multiple applications are well known. One example of a de-aeration device includes a rotary chamber for a fuel supply system, see GB Patent No. 763,004. De-aeration devices for lubrication systems are also well known, see U.S. Patent Publication No. 2002/0007736. Existing types of de-aeration devices can use a single chamber or multiple chambers to circulate fluid to expel air from the fluid.

Known types of de-aeration devices do not provide effectively separate lower mass hydraulic fluid containing high air content from higher mass hydraulic fluid containing less air content.

SUMMARY

It would be desirable to provide a compact de-aeration device for a hydraulically actuated variable valve actuation system that includes a simple way to effectively de-aerate the hydraulic fluid. This is achieved according to the invention by providing high velocity hydraulic fluid to a de-aeration chamber via a de-aeration bridge that is offset with respect to a generally vertical center axis of the de-aeration chamber.

In a preferred arrangement, an inlet port including a check valve is provided. A first passage is provided having a first and second end, with the first end of the first passage connected to the inlet port. A de-aeration bridge with a first and second end is connected to the first passage, preferably at the second end. The de-aeration bridge is connected at its second end to a top portion of a conical de-aeration chamber that has an outer wall and a generally vertical center axis. The second end of the de-aeration bridge is offset from the center axis of the de-aeration chamber such that hydraulic fluid flowing from the de-aeration bridge is directed towards the outer wall of the de-aeration chamber. A cover including a vent hole is located on a top surface of the de-aeration chamber. A holding chamber including a top and a bottom portion is connected via the top portion of the holding chamber to a bottom portion of the de-aeration chamber. A second passage that includes a first end and a second end is connected to the holding chamber at its first end, and the second end supplies the now de-aerated hydraulic fluid to a hydraulic fluid gallery of the variable valve actuation system.

A method of de-aerating hydraulic fluid for a hydraulically actuated variable valve actuation system is also provided. The method includes providing a de-aeration device for feeding the hydraulic fluid to the variable valve actuation system. The de-aeration device comprises an inlet port including a check valve, and a first passage having a first and second end, wherein the first end of the first passage is connected to the inlet port. A de-aeration bridge with a first end and a second end is connected to the second end of the first passage via its first end. A conical de-aeration chamber is also provided having an outer wall, a generally vertical center axis, and a top and bottom portion. The top portion of the de-aeration chamber is connected to the second end of the de-aeration bridge, with the second end of the de-aeration bridge being offset from the center axis of the de-aeration chamber such that hydraulic fluid flowing from the de-aeration bridge is directed towards the outer wall of the de-aeration chamber. A cover that includes a vent hole is located on a top surface of the de-aeration chamber. A holding chamber including a top and a bottom portion is connected via the top portion of the holding chamber to the bottom portion of the de-aeration chamber. The de-aeration device includes a second passage including a first end connected to the holding chamber, and a second end that supplies the de-aerated hydraulic fluid to a hydraulic fluid gallery of the variable valve actuation system. The method includes supplying the hydraulic fluid to the inlet port of the de-aeration device such that the hydraulic fluid flows from the first passage to the de-aeration bridge. The hydraulic fluid is de-aerated by providing a pressurized flow of the hydraulic fluid from the de-aeration bridge to the outer wall of the de-aeration chamber, such that hydraulic fluid with lower mass is forced to a center of the de-aeration chamber compared to hydraulic fluid with higher mass which is turned by the wall of the de-aeration chamber. Air is expelled from the hydraulic fluid radially inwardly towards the center axis of the de-aeration chamber, and axially upwards towards the vent hole in the cover. De-aerated hydraulic fluid from the de-aeration chamber is collected in the holding chamber, and the de-aerated hydraulic fluid is supplied to the hydraulic fluid gallery of the variable valve actuation system via the second passage.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
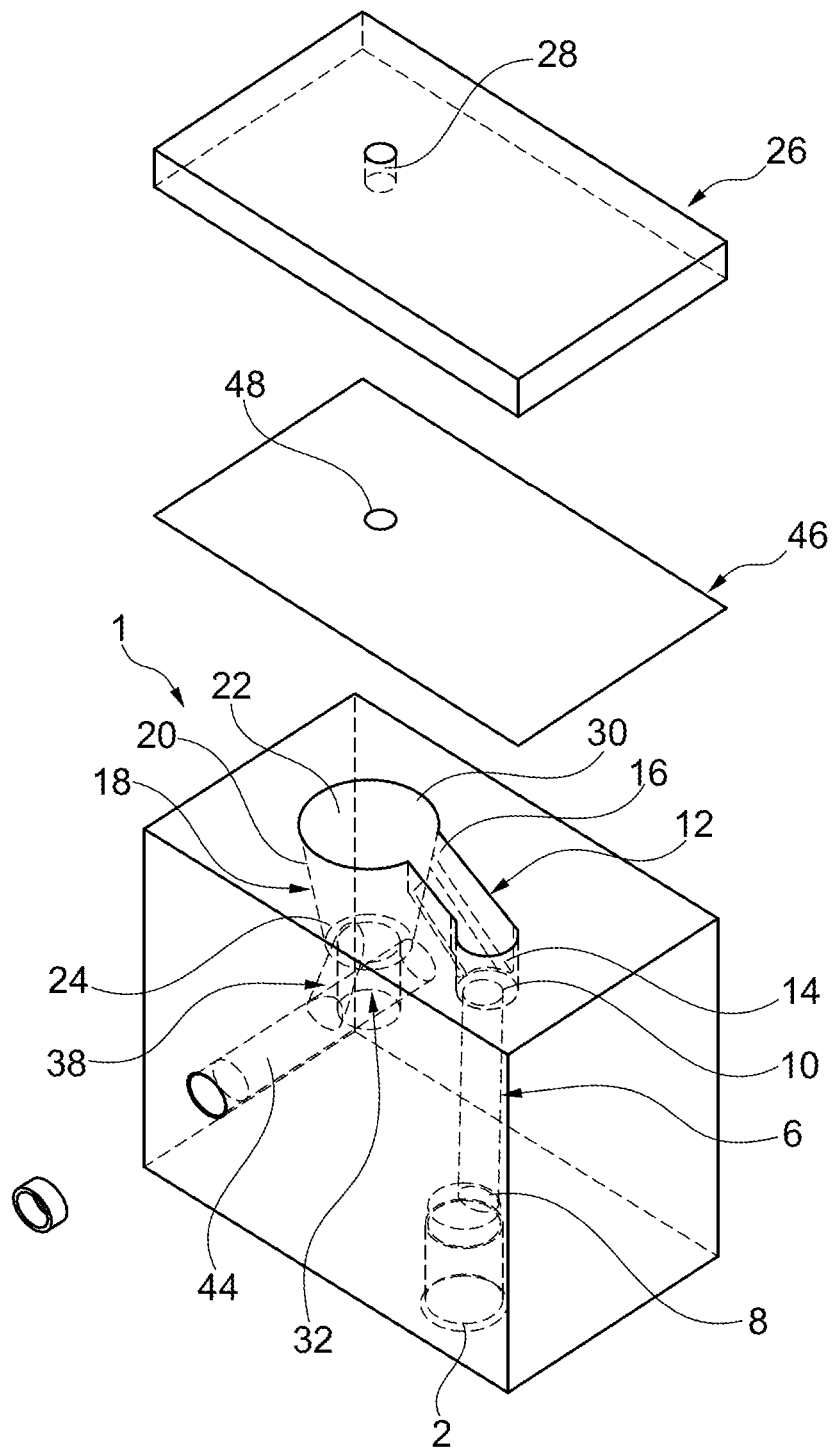
FIG. 1 is an exploded perspective view, shown as a wire frame model for clarity, of a hydraulic fluid de-aeration device according to the present invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
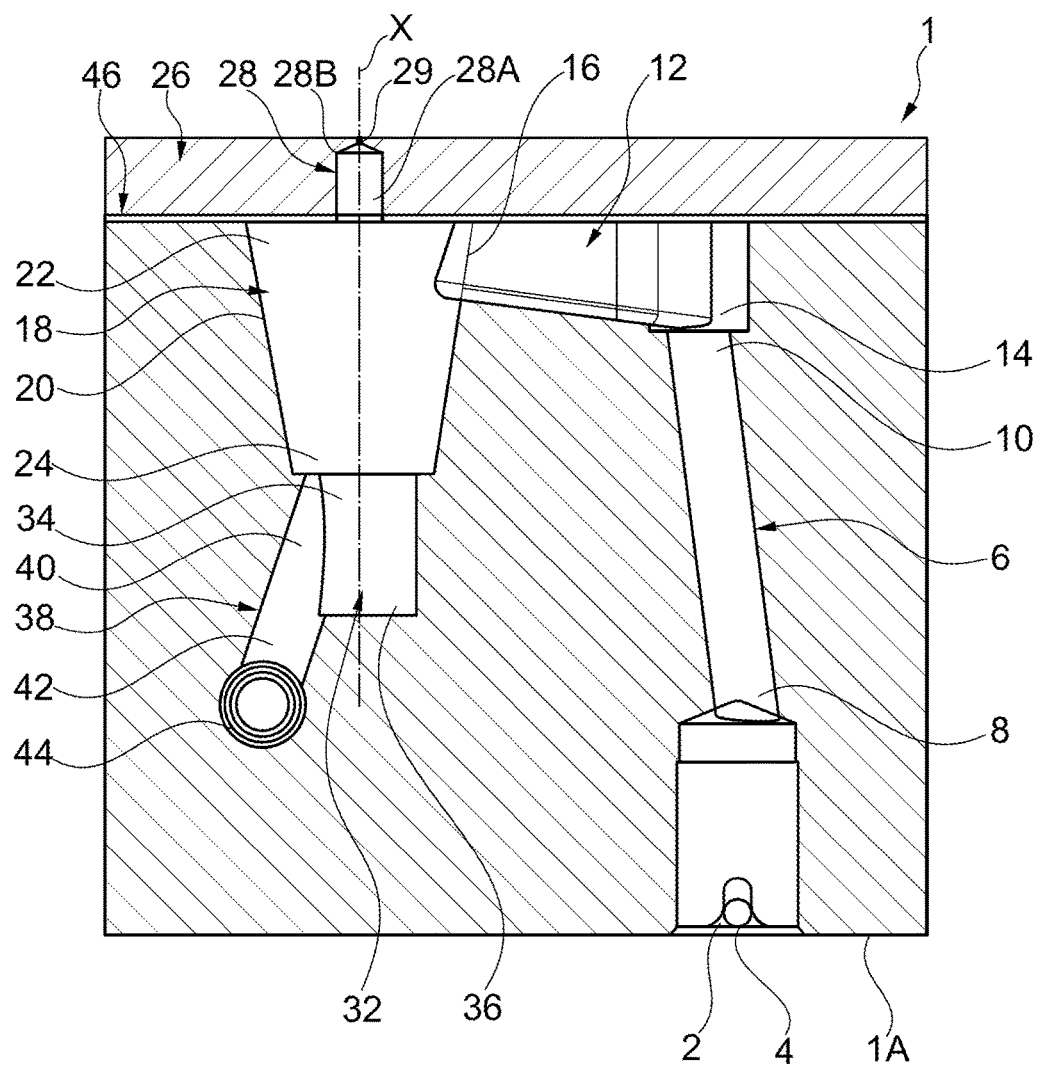
FIG. 2 is a side cross-sectional view of the de-aeration device of FIG. 1.
Figure 3:
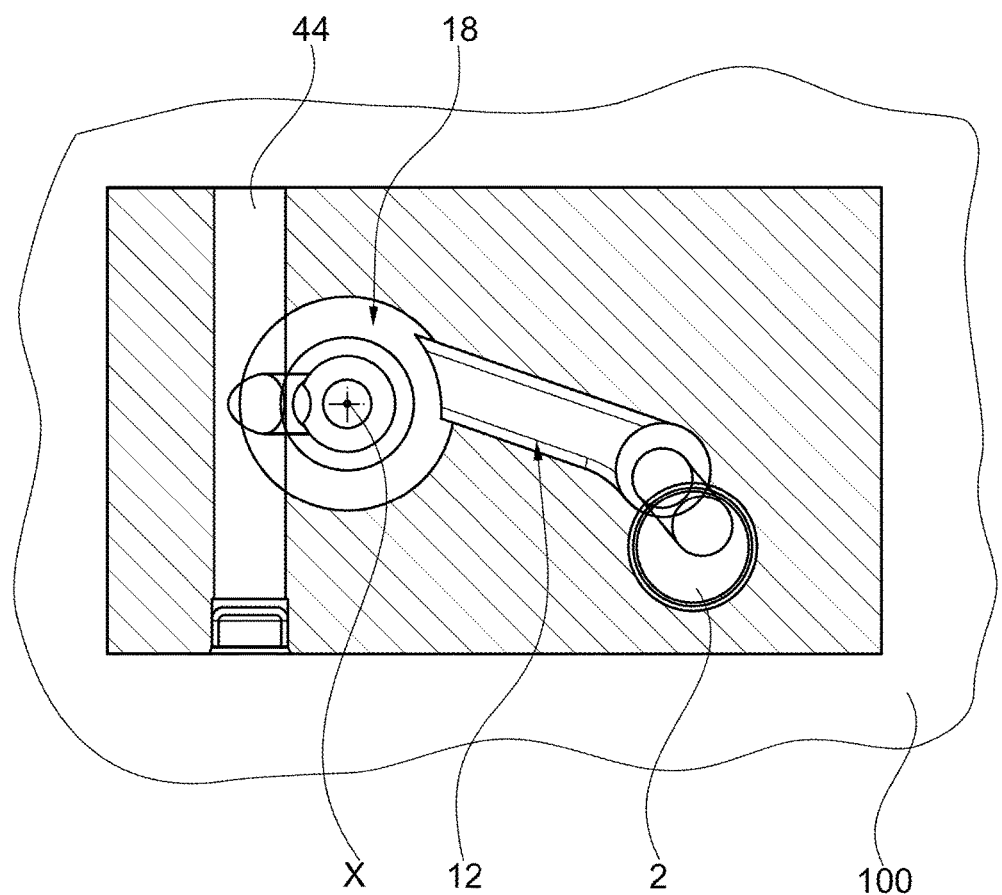
FIG. 3 is a top cross-sectional view of the de-aeration device of FIGS. 1 and 2.

As shown in FIGS. 1-3, a hydraulic fluid de-aeration device 1 for a hydraulically actuated variable valve actuation system 100 (shown schematically in FIG. 3) is provided. The de-aeration device 1 includes an inlet port 2 and a check valve 4. Preferably, the inlet port 2 is located on a bottom surface 1A of the de-aeration device 1. The inlet port 2 is connected to a hydraulic fluid supply line of an engine (not shown). The hydraulic fluid preferably enters the inlet port 2 at approximately 0.5-5 bar pressure. The check valve 4 is preferably a ball-check valve and prevents the back flow of fluid out of the device 1. A first passage 6 having a first end 8 and a second end 10 is connected to the inlet port 2 via the first end 8 of the first passage 6. The second end 10 of the first passage 6 is connected to a de-aeration bridge 12 having a first end 14 and a second end 16. The first end 14 of the de-aeration bridge 12 is connected to the second end 10 of the first passage 6. In one embodiment, a cross sectional area of the de-aeration bridge 12 decreases between the first end 14 and the second end 16. A conical de-aeration chamber 18 is connected to the de-aeration bridge 12. As shown in FIG. 2, the de-aeration chamber 12 has an outer wall 20, a generally vertical center axis (X), and a top portion 22 and a bottom portion 24. The top portion 22 of the de-aeration chamber 18 preferably has a larger cross sectional area than the bottom portion 24 of the de-aeration chamber 18. Preferably, the outer wall 20 tapers inwardly with a straight taper in cross-section. However, it would be possible to provide a convex or concave taper to the wall 20. The second end 16 of the de-aeration bridge 12 is offset from the generally vertical center axis (X) of the de-aeration chamber 18 such that hydraulic fluid flowing from the de-aeration bridge 12 after being accelerated by the de-aeration bridge 12 is directed towards the outer wall 20 of the de-aeration chamber 18. Preferably, the second end 16 of the de-aeration bridge 12 is approximately tangential to the outer wall 20 in its discharging area.

The hydraulic fluid travels from the de-aeration bridge 12 to the de-aeration chamber 18, and the hydraulic fluid is forced against the outer wall 20 of the de-aeration chamber 18. Due to a mass differential and centrifugal forces acting on the hydraulic fluid, air is separated in a transition region at an intersection of the de-aeration bridge 12 and de-aeration chamber 18 and is forced toward a center of the de-aeration chamber 18, while the hydraulic fluid is forced radially outwardly. As a result, air is expelled from the hydraulic fluid due to inertia and momentum effects experienced by the hydraulic fluid transitioning from the de-aeration bridge 12 to the de-aeration chamber 18 and rotating around the outer wall 20 of the de-aeration chamber 18. Air is displaced radially inwardly due to inertia and momentum of the hydraulic fluid, and is also forced axially upwardly due to buoyancy.

A cover 26 including a vent hole 28 is located on a top surface 30 of the de-aeration chamber 18. As shown in FIG. 2, the vent hole 28 includes a first end 28A that is cylindrical, and a second end 28B that is frustoconical with an opening 29. The opening 29 preferably has a 0.4 mm diameter that allows air to escape and prevents hydraulic fluid from leaking. A gasket 46 is preferably positioned between the cover 26 and the top surface 30 of the de-aeration chamber 18. As shown in FIG. 1, the gasket 46 includes an opening 48 that is preferably aligned with the vent hole 28 of the cover 46. However, this could be displaced in order to provide a separate air path.

As shown in FIG. 2, a holding chamber 32 including a top portion 34 and a bottom portion 36 is connected via the top portion 34 of the holding chamber 32 to the bottom portion 24 of the de-aeration chamber 18. The holding chamber 32 is preferably generally cylindrical, and is more preferably conical. The holding chamber 32 collects hydraulic fluid with lower air content compared to hydraulic fluid entering the de-aeration device 1 due to the expulsion of air in the de-aeration chamber 18.

A second passage 38 includes a first end 40 connected to the holding chamber 32, and a second end 42 that supplies the de-aerated hydraulic fluid to a hydraulic fluid gallery 44 of the variable valve actuation system 100. The hydraulic fluid exiting the hydraulic fluid gallery 44 has lower air content is more suitable for use in the hydraulically actuated variable valve actuation system 100.

A method of de-aerating hydraulic fluid for a hydraulically actuated variable valve actuation system 100 is also provided. The method includes providing hydraulic fluid to the de-aeration device 1 described above. The hydraulic fluid is supplied to the inlet port 2 of the de-aeration device 1 such that the hydraulic fluid flows from the first passage 6 to the de-aeration bridge 12. The hydraulic fluid is de-aerated by providing an accelerated flow of the hydraulic fluid from the de-aeration bridge 12 to the outer wall 20 of the de-aeration chamber 18, such that hydraulic fluid with lower mass (i.e., with entrained or trapped air) is forced to the center of the conical chamber compared to hydraulic fluid with higher mass which is turned by the wall of the de-aeration chamber. Air is expelled from the hydraulic fluid radially inwardly towards the center axis (X) of the de-aeration chamber 18, and axially upwards towards the vent hole 28 of the cover 26. De-aerated hydraulic fluid from the de-aeration chamber 18 is collected in the holding chamber 32, and the de-aerated hydraulic fluid is supplied to the hydraulic fluid gallery 44 of the variable valve actuation system 100 via the second passage 38.

Figure 4:
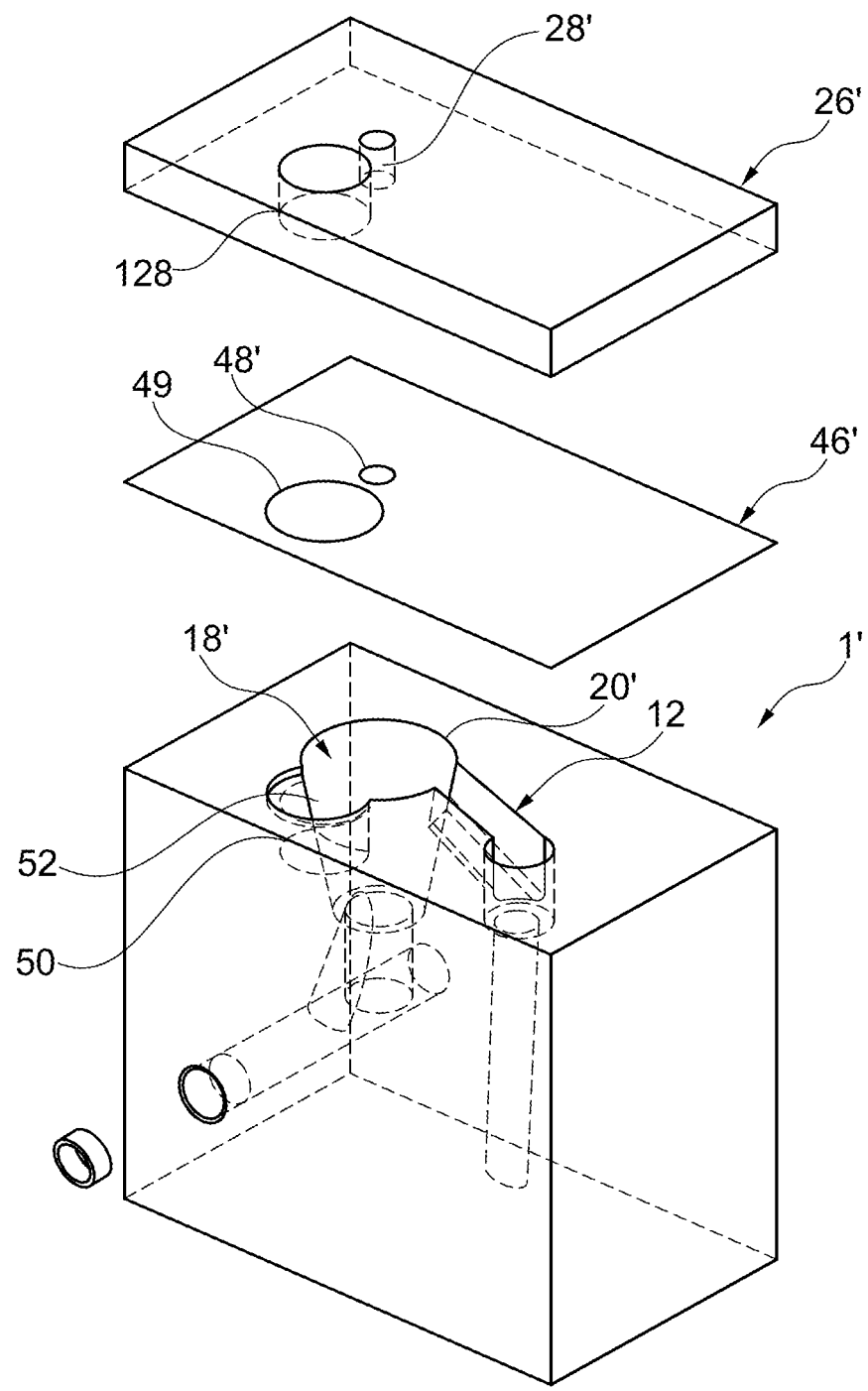
FIG. 4 is an exploded perspective view, shown as a wire frame model for clarity, of a de-aeration device according to a second embodiment of the present invention.
Figure 5:
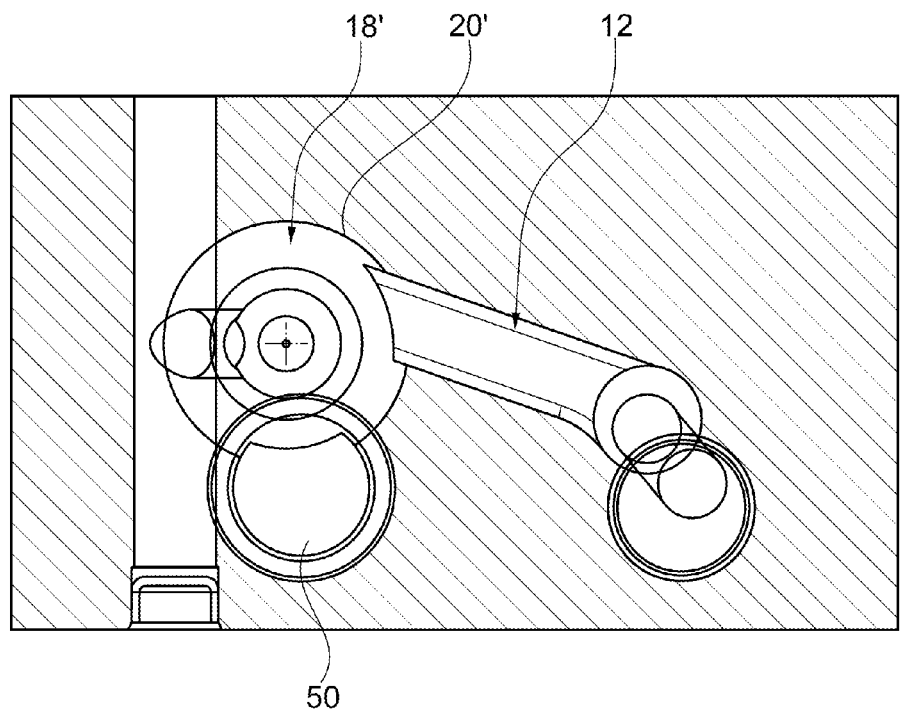
FIG. 5 is a top cross-sectional view of the de-aeration device of FIG. 4.

Referring now to FIGS. 4 and 5, a second embodiment of a de-aeration device 1' is shown. The second embodiment is the same as the first embodiment, except the de-aeration chamber 18' is connected to a first fill chamber 50. The first fill chamber 50 provides additional space for hydraulic fluid during an initialization step to ensure that the hydraulically actuated variable valve actuation system 100 is provided with adequate hydraulic fluid prior to an initial start of an engine. The de-aeration chamber 18' includes an outer wall 20' having an inlet 52 to the first fill chamber 50. Despite the location of this inlet 52, the rotational flow of hydraulic fluid from the de-aeration bridge 12 around the outer wall 20' is not affected, and the hydraulic fluid is de-aerated as explained above with respect to the first embodiment. In this embodiment, an alternative gasket 46' is provided with a first opening 48' for de-aeration, and a second opening 49 for the first fill chamber 50. An alternative cover 26' is also provided, which includes a vent hole 28' and a first fill hole 128.

Figure 6:
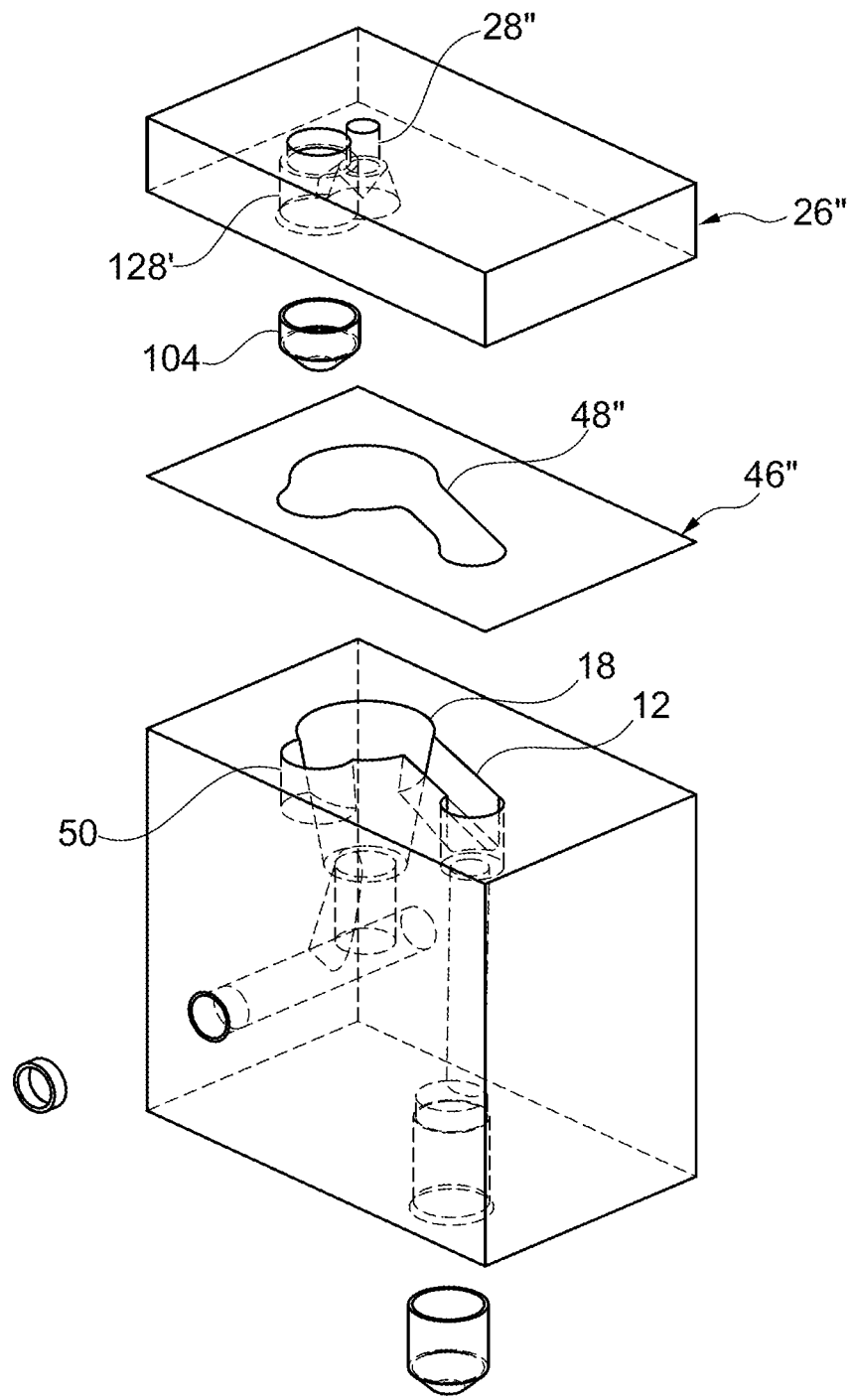
FIG. 6 is an exploded perspective view, shown as a wire frame model for clarity, of a de-aeration device according to a third embodiment of the present invention.
Figure 7:
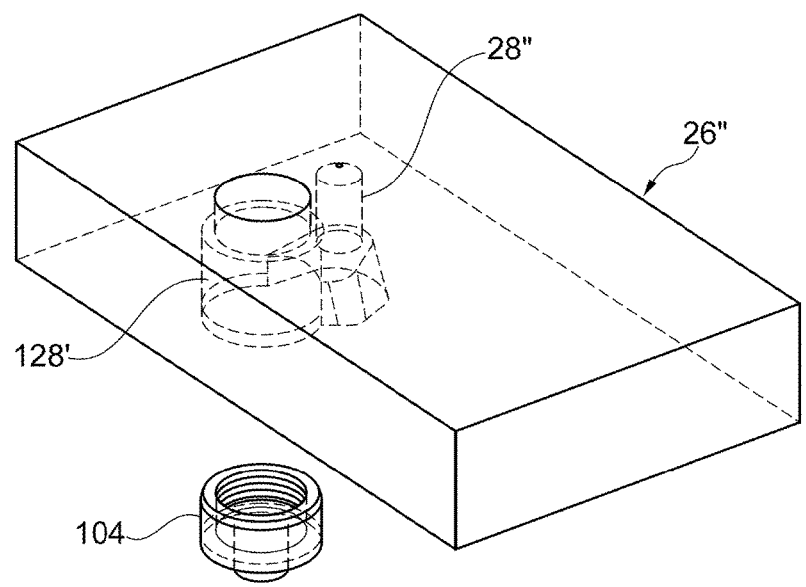
FIG. 7 is a magnified exploded perspective view, shown as a wire frame model for clarity, of a cover of FIG. 6
Figure 8:
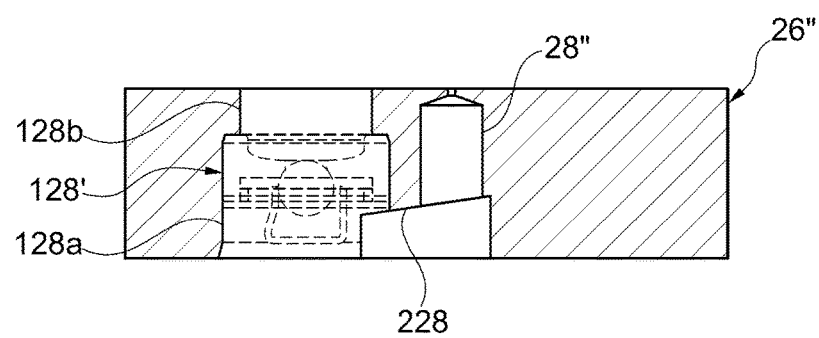
FIG. 8 is a side cross-sectional view of the cover of FIGS. 6 and 7.

Referring now to FIGS. 6-8, an alternative embodiment of the cover 26" and the gasket 46" is provided. In this embodiment, the gasket 46" includes an opening 48'" that extends over a periphery of the de-aeration bridge 12, the de-aeration chamber 18, and the first fill chamber 50. The cover 26" includes a first fill hole 128' and a vent hole 28". The first fill hole 128' includes a first portion 128a located adjacent to the first fill chamber 50, and a second portion 128b located adjacent to a top surface of the cover 26". Preferably the first portion 128a has a larger diameter than the second portion 128b. A first fill check valve 104 can be inserted from the bottom of the cover 26" and rest against a shoulder formed in the first fill hole 128' by the second portion 128b. The first fill check valve 104 causes a pocket of air to collect in the first fill hole 128' underneath the first fill check valve 104. An angled intermediate portion 228 of the cover 26" extends between the first fill hole 128' and the vent hole 28", and directs air from the first fill hole 128' to the vent hole 28" and out of the de-aeration device.

Having thus described various embodiments of the present de-aeration device in detail, it is to be appreciated and will be apparent to those skilled in the art that many changes, only a few of which are exemplified in the detailed description above, could be made in the device without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

Log To Reference Numbers 1, 1'. De-aeration device
1A. Bottom surface of de-aeration device
2. Inlet port
4. Check valve
6. First passage
8. First end of first passage
10. Second end of first passage
12. De-aeration bridge
14. First end of de-aeration bridge
16. Second end of de-aeration bridge
18, 18'. De-aeration chamber
20, 20'. Outer wall of de-aeration chamber
22. Top portion of de-aeration chamber
24. Bottom portion of de-aeration chamber
26, 26', 26". Cover
28, 28', 28". Vent hole
28A. First end of vent hole
28B. Second end of vent hole
29. Opening of second end of vent hole
30. Top surface of de-aeration chamber
32. Holding chamber
34. Top portion of holding chamber
36. Bottom portion of holding chamber
38. Second passage
40. First end of second passage
42. Second end of second passage
44. Hydraulic fluid gallery
46, 46', 46". Gasket
48, 48', 48". Opening of gasket
49. Second opening
50. First fill chamber
52. Inlet of first fill chamber
100. Hydraulically actuated variable valve actuation system
104. First fill check valve
128, 128'. First fill hole
128a. First portion of first fill hole
128b. Second portion of fill hole

What is claimed is:

1. A hydraulic fluid de-aeration device for a hydraulically actuated variable valve actuation system, the device comprising:
    an inlet port;
    a first passage having a first and second end, the first end of the first passage is connected to the inlet port;
    a de-aeration bridge having a first and second end, and the first end of the de-aeration bridge is connected to the second end of the first passage;
    a conical de-aeration chamber having an outer wall, a generally vertical center axis, and a top and bottom portion, the top portion of the de-aeration chamber is connected to the second end of the de-aeration bridge, the second end of the de-aeration bridge is offset from the center axis of the de-aeration chamber such that hydraulic fluid flowing from the de-aeration bridge is directed towards the outer wall of the de-aeration chamber;
    a cover including a vent hole located on a top surface of the de-aeration chamber;
    a holding chamber including a top and a bottom portion is connected via the top portion of the holding chamber to the bottom portion of the de-aeration chamber;
    a second passage including a first end that is connected to the holding chamber, and a second end that supplies the hydraulic fluid to a hydraulic fluid gallery of the variable valve actuation system; and
    a gasket arranged between the cover and the top surface of the de-aeration chamber, the gasket including an opening that is aligned with the vent hole of the cover.

2. The hydraulic fluid de-aeration device of claim 1, wherein the inlet port includes a check valve.

3. The hydraulic fluid de-aeration device of claim 1, wherein the holding chamber is conical.

4. The hydraulic fluid de-aeration device of claim 1, wherein a cross-sectional area of the top portion of the de-aeration chamber is larger than a cross-sectional area of the bottom portion of the de-aeration chamber.

5. The hydraulic fluid de-aeration device of claim 1, wherein the inlet port is located on a bottom surface of the de-aeration device.

6. The hydraulic fluid de-aeration device of claim 1, wherein the vent hole of the cover includes a first end that is cylindrical, and a second end that is frustoconical and has an opening.

7. The hydraulic fluid de-aeration device of claim 1, further comprising a first fill chamber connected to the de-aeration chamber via an inlet.

8. The hydraulic fluid de-aeration device of claim 1, wherein a cross sectional area of the de-aeration bridge decreases between the first end and the second end.

9. A method for de-aerating hydraulic fluid for a hydraulically actuated variable valve actuation system, the method comprising:
    providing a de-aeration device for feeding the hydraulic fluid to the variable valve actuation system, the de-aeration device comprising:

an inlet port;

a first passage having a first and second end, the first end of the first passage is connected to the inlet port;

a de-aeration bridge having a first and second end, and the first end of the de-aeration bridge is connected to the second end of the first passage;

a conical de-aeration chamber having an outer wall, a generally vertical center axis, and a top and bottom portion, the top portion of the de-aeration chamber is connected to the second end of the de-aeration bridge, the second end of the de-aeration bridge is offset from the center axis of the de-aeration chamber such that hydraulic fluid flowing from the de-aeration bridge is directed towards the outer wall of the de-aeration chamber;

a cover including a vent hole located on a top surface of the de-aeration chamber;

a holding chamber including a top and a bottom portion is connected via the top portion of the holding chamber to the bottom portion of the de-aeration chamber;

a second passage including a first end that is connected to the holding chamber, and a second end that supplies the hydraulic fluid to a hydraulic fluid gallery of the variable valve actuation system; and a gasket arranged between the cover and the top surface of the de-aeration chamber, the gasket including an opening that is aligned with the vent hole of the cover;

supplying the hydraulic fluid to the inlet port of the de-aeration device such that the hydraulic fluid flows from the first passage to the de-aeration bridge, de-aerating the hydraulic fluid by providing an accelerated flow of the hydraulic fluid from the de-aeration bridge to the outer wall of the de-aeration chamber, such that hydraulic fluid with lower mass is forced to a center of the de-aeration chamber compared to hydraulic fluid with higher mass which is turned by the wall of the de-aeration chamber, expelling air from the hydraulic fluid radially inwardly towards the center axis of the de-aeration chamber, and axially upwards towards the vent hole of the cover, collecting de-aerated hydraulic fluid from the de-aeration chamber in the holding chamber, and supplying the de-aerated hydraulic fluid to the hydraulic fluid gallery of the variable valve actuation system via the second passage.

10. The hydraulic fluid de-aeration device of claim 1, wherein the opening of the gasket extends over a periphery of the de-aeration bridge.

11. A hydraulic fluid de-aeration device for a hydraulically actuated variable valve actuation system, the device comprising:

an inlet port;

a first passage having a first and second end, the first end of the first passage is connected to the inlet port;

a de-aeration bridge having a first and second end, and the first end of the de-aeration bridge is connected to the second end of the first passage;

a conical de-aeration chamber having an outer wall, a generally vertical center axis, and a top and bottom portion, the top portion of the de-aeration chamber is connected to the second end of the de-aeration bridge, the second end of the de-aeration bridge is offset from the center axis of the de-aeration chamber such that hydraulic fluid flowing from the de-aeration bridge is directed towards the outer wall of the de-aeration chamber;

a cover including a vent hole located on a top surface of the de-aeration chamber;

a holding chamber including a top and a bottom portion is connected via the top portion of the holding chamber to the bottom portion of the de-aeration chamber;

a second passage including a first end that is connected to the holding chamber, and a second end that supplies the hydraulic fluid to a hydraulic fluid gallery of the variable valve actuation system; and a first fill chamber connected to the de-aeration chamber via an inlet.

12. The hydraulic fluid de-aeration device of claim 11, wherein the inlet port includes a check valve.

13. The hydraulic fluid de-aeration device of claim 11, further comprising a gasket arranged between the cover and the top surface of the de-aeration chamber, the gasket including an opening that is aligned with the vent hole of the cover.

14. The hydraulic fluid de-aeration device of claim 11, wherein the holding chamber is conical.

15. The hydraulic fluid de-aeration device of claim 11, wherein a cross-sectional area of the top portion of the de-aeration chamber is larger than a cross-sectional area of the bottom portion of the de-aeration chamber.

16. The hydraulic fluid de-aeration device of claim 11, wherein the inlet port is located on a bottom surface of the de-aeration device.

17. The hydraulic fluid de-aeration device of claim 11, wherein the vent hole of the cover includes a first end that is cylindrical, and a second end that is frustoconical and has an opening.

18. The hydraulic fluid de-aeration device of claim 11, wherein a cross sectional area of the de-aeration bridge decreases between the first end and the second end.

19. The hydraulic fluid de-aeration device of claim 13, wherein the opening of the gasket extends over a periphery of the de-aeration bridge.

20. The hydraulic fluid de-aeration device of claim 11, wherein the outer wall of the de-aeration chamber includes the inlet to the first fill chamber.

* * * * *